M. Levett,
Plate for Artificial Teeth.
Nº 19,858.   Patented Apr. 6, 1858.

Witnesses:
Lemuel W. Serrell
Thomas G. Harold

Inventor:
Morris Levett

UNITED STATES PATENT OFFICE.

MORRIS LEVETT, OF NEW YORK, N. Y.

ATMOSPHERIC-PRESSURE DENTAL PLATE.

Specification of Letters Patent No. 19,858, dated April 6, 1858.

*To all whom it may concern:*

Be it known that I, MORRIS LEVETT, of the city, county, and State of New York, have invented, made, and applied to use a certain new and useful Improvement in Atmospheric Pressure or Suction Plates for Artificial Teeth; and I do hereby declare that the following is a full, clear, and exact description of the construction and operation of the same, reference being had to the annexed drawing, making part of this specification, wherein—

Figure 2:
Figure 1:
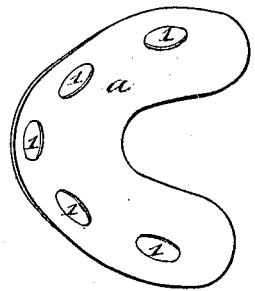

Figure 1 is a plan of the top of said atmospheric plate and Fig. 2 is a vertical section of the same.

Similar marks of reference indicate the same parts.

In Levi Gilbert's patent of Feb. 15th, 1848, an atmospheric suction plate is shown, in which a cavity is provided, to act on the roof of the mouth, centrally of the same. In this case the sustaining power for the plate comes on the roof of the mouth in such a manner as to be often very disagreeable to the person wearing the same, both on account of the strain coming on that part which is naturally free and unobstructed, and also from the injurious effects on the organs of taste and the obstructions to mastication. Plates for teeth have also been made to fit the gums or alveolar ridge and kept to their place by suction and atmospheric pressure, and this character of plate has also been formed with a long narrow groove to produce additional adhesion at the alveolar ridge. In either case, if the plate becomes detached from any unusual strain at one part, the air passes immediately into the cavity and between the plate and the gum.

The nature of my said invention consists in the use of separate atmospheric cells or cavities in the plate acting on the alveolar ridge, by which the central cavity of Gilbert is dispensed with and the obstruction to the motions of the tongue removed. The plate is held firmly in place, the gums are drawn by the suction into the form of separate nipples or projections, and if one or two of the cavities become detached from undue strain in mastication, the other cavities will prevent the plate falling into the mouth, and the party wearing the same has the opportunity again to exhaust the air from the detached cells by the tongue, in the usual manner.

In the drawing $a$, is the plate to which the artificial teeth ($b$) are to be attached in any usual manner, and said plate is to be shaped so as to fit the mouth of the person wearing the same. Through this plate $a$, I make elliptical openings 1, 1, and attach to the under side cap plates 2, 2, so as to form the desired number of cavities around the ridge of the gums. These cavities might be formed by suitable punches, instead of making a hole and then soldering on the cap plate. The plate containing the artificial teeth is caused to adhere to the gums by drawing the air out of the cavities by producing a partial vacuum in the mouth by the tongue.

I do not claim retaining the plate of artificial teeth in place by means of atmospheric pressure as the same has been applied both to the roof of the mouth and also at the alveolar ridge, but—

What I claim as my invention and desire to secure by Letters Patent is—

The manner herein described of attaching the plates of artificial teeth by means of separate cells or cavities acting upon the alveolar ridge substantially in the manner and for the purposes specified.

In witness whereof I have hereunto set my signature this twenty-fourth day of November, 1857.

MORRIS LEVETT.

Witnesses:
LEMUEL W. SERRELL,
THOMAS G. HAROLD.